United States Patent
Niessner et al.

(10) Patent No.: US 12,503,412 B2
(45) Date of Patent: Dec. 23, 2025

(54) RECYCLING OF STYRENE OLIGOMERS BY DE-POLYMERIZATION PROCESS

(71) Applicant: INEOS STYROLUTION GROUP GMBH, Frankfurt am Main (DE)

(72) Inventors: Norbert Niessner, Friedelsheim (DE); Bianca Wilhelmus, Hanau (DE); Achim Schmidt-Rodenkirchen, Bayreuth (DE); Konstantin Mierdel, Bayreuth (DE)

(73) Assignee: INEOS STYROLUTION GROUP GMBH, Frankfurt am Main (DE)

( * ) Notice: Subject to any disclaimer, the term of this patent is extended or adjusted under 35 U.S.C. 154(b) by 297 days.

(21) Appl. No.: 18/546,856

(22) PCT Filed: Feb. 22, 2022

(86) PCT No.: PCT/EP2022/054391
§ 371 (c)(1),
(2) Date: Aug. 17, 2023

(87) PCT Pub. No.: WO2022/180030
PCT Pub. Date: Sep. 1, 2022

(65) Prior Publication Data
US 2024/0140884 A1  May 2, 2024

(30) Foreign Application Priority Data
Feb. 25, 2021 (EP) .................... 21159259

(51) Int. Cl.
*C07C 4/22* (2006.01)
(52) U.S. Cl.
CPC .................... *C07C 4/22* (2013.01)
(58) Field of Classification Search
CPC .................... C07C 4/22
See application file for complete search history.

(56) References Cited

U.S. PATENT DOCUMENTS

| | | | |
|---|---|---|---|
| 5,055,167 A | 10/1991 | Dummersdorf et al. | |
| 5,672,794 A | 9/1997 | Northemann | |
| 10,301,235 B1 | 5/2019 | Cavinaw et al. | |

FOREIGN PATENT DOCUMENTS

| | | | |
|---|---|---|---|
| EP | 1966291 A1 | 9/2008 | |
| GB | 1369964 A | 10/1974 | |
| JP | 2003267896 A | * 9/2003 | |
| WO | 2007063462 A1 | 6/2007 | |

OTHER PUBLICATIONS

Kamiyama, JP 2003-267896 A, English translation.*
G. Grause et al., Feedstock recycling of waste polymeric material, in: Journal of Material Cycles and Waste Management, 13(4), 2011, 265-282.
C. Bouster et al., Study of the pyrolysis of polystyrenes: Kinetics of thermal decomposition, Journal of Analytical and Applied Pyrolysis, 1 (1980) 297-313.
C. Bouster et al., Evolution of the product yield with temperature and molecular weight in the pyrolysis of polystyrene, in: Journal of Analytical and Applied Pyrolysis 15 (1989) 249-259.
D. S. Achilias et al. (Chemical recycling of polystyrene by pyrolysis: Potential use of the liquid product for the reproduction of polymer, in: Macromolecular Materials and Engineering, 292(8) (2007) 923-934.
D. Baskaran, Anionic Vinyl Polymerization, Controlled and Living Polymerizations: From Mechanisms to Applications, John Wiley & Sons, 2009, 1-56.

* cited by examiner

*Primary Examiner* — Randy Boyer
(74) *Attorney, Agent, or Firm* — RAPHAEL BELLUM PLLC

(57) ABSTRACT

A process for producing styrene monomers from styrene oligomers comprises the following steps: a) providing a composition (A) comprising at least one type of styrene oligomer, wherein the composition (A) comprises at least 15 wt.-% of styrene dimers and/or styrene trimers; b) providing a depolymerization reactor (R) with a reaction zone (Z); c) feeding the composition (A) into the reaction zone (Z) of the reactor (R); d) depolymerizing the at least one type of styrene oligomer in the reaction zone (Z) to obtain a composition (B), comprising styrene monomers; e) removing the composition (B) from the reaction zone (Z); and f) isolating the styrene monomers from the composition (B); wherein the temperature (T) inside the reaction zone (Z) is above 500° C. to below 800° C. and the average residence time (tA) of the composition (A) in the reaction zone (Z) is greater than 0.01 s and less than 60 s.

20 Claims, 2 Drawing Sheets

RECYCLING OF STYRENE OLIGOMERS BY DE-POLYMERIZATION PROCESS

The invention relates to a process for producing styrene monomers from styrene oligomers by means of a thermic de-polymerization process.

Climate change, environmental pollution, population growth and resource dependency trigger the ecological and economic necessity of the transition from a linear to a circular economy. Since the 1990s, intensive efforts to develop improved processes for the recovery of raw materials from recycling of plastic waste were made. These efforts have not yet resulted in large-scale applications, in particular due to unresolved process engineering problems and economic reasons, such as the non-availability of suitable materials. However, the topic of plastic waste as well as a greater ecological awareness and a need for sustainable solutions have led to a growing interest in chemical recycling.

Not all thermoplastic polymers are equally suited for chemical recycling. The thermal decomposition of polyolefins or polyesters results in mixtures of waxes, light oil and gases. The degradation of polyethylene terephthalate (PET) results in organic acids, mainly benzoic acid and terephthalic acid, which are corrosive and may also cause clogging of the reactor (G. Grause et al., Feedstock recycling of waste polymeric material, in: Journal of Material Cycles and Waste Management, 13(4), 2011, 265-282).

In the case of polystyrene and other styrene-containing polymers, it is possible to depolymerize the polymers into the basic components, especially styrenic monomers, which make polystyrene and other styrene monomer-containing polymers excellent choices for chemical recycling. However, the resulting product mixture of a de-polymerization process needs to be purified in order to use the components as raw material for new purposes, such as polymerization processes.

If polystyrene is sufficiently thermally treated, it decomposes to styrene monomers, but incomplete decomposition also results in the formation of e.g. styrene dimers, trimers and other oligomers. If the decomposition conditions are too strong, side products, e.g. benzene, toluene, ethylbenzene, cumene and alpha-methyl styrene, may be formed. The amounts of these reaction products vary and depend on the reaction conditions and on the raw materials used (see C. Bouster et al., Study of the pyrolysis of polystyrenes: Kinetics of thermal decomposition, Journal of Analytical and Applied Pyrolysis, 1 (1980) 297-313 and C. Bouster et al., Evolution of the product yield with temperature and molecular weight in the pyrolysis of polystyrene, in: Journal of Analytical and Applied Pyrolysis 15 (1989) 249-259).

Aromatic compounds other than styrenic monomers can act as chain transfer agents in radical-based polymerization processes, lowering the average molecular weight of the polymers produced and contributing to polymers with a lower glass transition temperature (Tg), see D. S. Achilias et al. (Chemical recycling of polystyrene by pyrolysis: Potential use of the liquid product for the reproduction of polymer, in: Macromolecular Materials and Engineering, 292(8) (2007) 923-934). Acidic protons from e.g. carboxylic acid, alcohols, aldehydes or ketones act as terminating agent in anionic polymerization processes of styrene (D. Baskaran, Anionic Vinyl Polymerization, Controlled and Living Polymerizations: From Mechanisms to Applications, John Wiley & Sons, 2009, 1-56).

Styrenic monomers can be used, e.g. for a new polymerization process. Styrenic oligomers may disturb the polymerization process, as they influence, even in small quantities, important properties of the polymer. This is similar for other side products as well. Therefore, the styrenic monomers have to be separated from other components of the product mix, to ensure a high product quality.

DE 2310463 (Japan Steel Works) claims the pyrolysis and thermal decomposition of plastics. De-polymerization is carried out in a conventional twin-screw extruder. The volatile monomers are captured via appropriate devices, while the residue in the form of a melt is extruded.

W. Kaminsky (Recycling of Plastics, in Conservation & Recycling, Vol. 1 (1976) 91-110) proposes the decomposition of polymers in a fluidized-bed reactor.

U.S. Pat. No. 5,055,167 (Chemieanlagenbau) describes the conversion of polymer waste products by plasma-chemical means into chemical raw materials from which they were originally synthesized.

EP-A 0 649 827 (BASF) describes a process for recovering e.g. styrene from polystyrene products. The process for recovering monomeric styrene from plastics waste containing styrene polymers by thermal depolymerization comprises the step that the waste in liquid or solid form is transported into a fluidized bed of magnesium aluminum silicate heated to 400-700° C. and is cracked or depolymerized in an average residence time of less than 60 seconds and styrene is recovered from the gaseous crack products. The $C_1$-$C_6$ hydrocarbons formed as byproducts in the depolymerization are circulated as operating gas for maintaining the fluidized bed. The document describes a method for recovering monomers from polymers, but it does not discuss the issue of oligomeric compounds being produced in de-polymerization processes, and whether and how these oligomers can be utilized.

U.S. Ser. No. 10/301,235 (Agilyx) describes a method of recovering styrene monomer from waste polystyrene, the method comprising: mixing, heating and compacting a supply of waste polystyrene to form a densified polystyrene containing melt; supplying the densified polystyrene containing melt to a pyrolysis reactor along with a supply of recycled oligomers; pyrolyzing the densified polystyrene containing melt and recycled oligomers within the pyrolysis reactor to generate a hydrocarbon gas stream and a solids residue stream; condensing out oligomers from the hydrocarbon gas stream output from the pyrolysis reactor with a quenching apparatus and routing the oligomers upstream to the pyrolysis reactor to be combined as the supply of recycled oligomers with the densified polystyrene containing melt; discharging an altered hydrocarbon gas stream from the quenching aparatus. The document does not teach whether it is possible to recycle styrene oligomers in the absence of a densified polystyrene melt, e.g. to recycle the oligomers alone. The disclosure does not provide information on conditions, how high styrene monomer yields from the oligomers can be achieved.

An objective of the present invention is to identify a process and depolymerization conditions under which the thermal depolymerization of styrene oligomers leads to particularly high yields of styrene monomers.

Surprisingly it was now found that the yield of styrene from styrene oligomers can be particularly increased, when the depolymerization process is carried out under the conditions outlined below.

A first aspect of the present invention is therefore a process for producing styrene monomers from styrene oligomers comprising the following steps:
 a) providing a composition (A) comprising at least one type of styrene oligomer, wherein the composition (A)

comprises at least 15 wt.-%, preferably at least 20 wt.-%, based on the total weight of composition (A), of styrene dimers and/or styrene trimers;

b) providing a depolymerization reactor (R) with a reaction zone (Z);

c) feeding the composition (A) into the reaction zone (Z) of the reactor (R);

d) depolymerizing (at least a portion of) the at least one type of styrene oligomer in the reaction zone (Z) to obtain a composition (B), comprising styrene monomers;

e) removing the composition (B) from the reaction zone (Z); and f) isolating (at least a portion of) the styrene monomers from the composition (B);

wherein the temperature (T) inside the reaction zone (Z) of the reactor is set to a value of above 500° C. to below 800° C.; and wherein the average residence time (tA) of the composition (A) in the reaction zone (Z) of the reactor is set to a value greater than 0.01 s but less than 60 s.

Another aspect of the present invention is the use of the process of the invention for the recovery of styrene monomer from a composition (A) comprising one or more types of styrene oligomers, wherein the styrene product finally obtained comprises less than 0.01 wt.-% of styrene dimers and/or styrene trimers. Further purification is applied.

The process details of the invention and the components used therein will be discussed below in more detail.

Step a)

In step a), a composition (A) is provided. Composition (A) is a composition comprising at least one type of styrene oligomer. In the context of the present invention, an oligomer is a structure that contains from 2 to 50 repeating units derived from a specific monomer, e.g. styrene repeating units. The molecular weight is in the range of about 210 to about 5000 g/mol. Accordingly, the term "oligomer" includes dimers, containing 2 repeating units derived from the specific monomer, and trimers, containing 3 repeating units derived from the specific monomer. An oligomer with a specific number # of repeating units that is not 2 or 3 is referred to as #-mer, e.g. an oligomer with 5 repeating units is referred to as 5-mer. In contrast, a structure that contains more than 50 repeating units derived from a specific monomer is referred to as polymer. Accordingly, a co-oligomer in the context of the present invention is a structure that contains a total of from 2 to 50 repeating units derived from at least two different monomers, e.g. styrene repeating units and acrylonitrile repeating units. In contrast, a structure that contains in total more than 50 repeating units derived from at least two different monomers is referred to as co-polymer.

The composition (A) comprises at least 15 wt.-%, preferably at least 20 wt.-%, more preferably at least 40 wt.-%, more preferably at least 60 wt.-%, based on the total weight of composition (A), of styrene dimers and/or styrene trimers.

For example, composition (A) may comprise at least 5 wt.-%, preferably at least 10 wt.-%, more preferably at least 20 wt.-%, more preferably at least 30 wt.-%, even more preferably at least 35 wt.-%, based on the total weight of composition (A), of styrene dimers and at least 5 wt.-%, preferably at least 10 wt.-%, more preferably at least 15 wt.-%, more preferably at least 20 wt.-%, even more preferably at least 25 wt.-%, based on the total weight of composition (A), of styrene trimers.

In addition to styrene dimers (Mw 210 g/mol) and styrene trimers, composition (A) may comprise other styrene oligomers. It is favorable when the maximum degree of polymerization in any of the styrene oligomers in composition (A) does not exceed 20 styrene repeating units, preferably not exceed 15 styrene repeating units, more preferably does not exceed 10 repeating units, even more preferably does not exceed 5 repeating units. Furthermore, depending on the preparation method of composition (A), it may also comprise styrene monomers. Preferably, composition (A) does not contain any polymers or co-polymers.

If styrene oligomers other than styrene dimers and styrene trimers are present in composition (A), their amount typically does not exceed 70 wt.-%, preferably does not exceed 40 wt.-%, more preferably does not exceed 20 wt.-%, more preferably does not exceed 15 wt.-%, based on the total weight of composition (A).

If styrene monomers are present in composition (A), their amount typically does not exceed 70 wt.-%, preferably does not exceed 50 wt.-%, more preferably does not exceed 30 wt.-%, even more preferably does not exceed 25 wt.-%, based on the total weight of composition (A).

Furthermore, composition (A) may comprise monomers other than styrene, oligomers of such monomers and/or co-oligomers of such monomers, preferably co-oligomers of such monomers with styrene monomers. Such monomers other than styrene are often selected from the group consisting of ethylene, alpha-olefins such as 1-propylene or 1-butylene, alpha-methyl styrene, alkyl acrylates such as butyl acrylate, alkyl methacrylates, such as methyl methacrylate, dienes such as butadiene or isoprene, acrylonitrile, methacrylonitrile and vinyl chloride. Preferably, such monomers other than styrene, if present, are selected from the group consisting of butyl methacrylate, methyl methacrylate, acrylonitrile, alpha-methyl styrene and butadiene. More preferably, such monomers other than styrene are selected from the group consisting of butyl methacrylate, acrylonitrile and butadiene.

If monomers other than styrene, oligomers of such monomers and/or co-oligomers of such monomers are present in composition (A), their amount typically does not exceed 20 wt.-%, preferably does not exceed 15 wt.-%, more preferably does not exceed 10 wt.-%, even more preferably does not exceed 5 wt.-%, based on the total weight of composition (A).

Other components that may be present in composition (A) are auxiliaries, additives and/or impurities, e.g. water, halogenated substances, inorganic or organic dyes or pigments, lubricants, waxes, amides of long chain organic acids, emulsifiers, soaps, paper, cardboard, metals, metal oxides, metal salts, fillers, and other additives such as UV stabilizers, hindered amine light stabilizers (HALS), hindered phenols, disulfite stabilizers, quenchers and absorbers. If such auxiliaries or additives are present in composition (A), their amount typically does not exceed 10 wt.-%, preferably does not exceed 5 wt.-%, more preferably does not exceed 2 wt.-%, even more preferably does not exceed 1 wt.-%, often from 0.1 to 0 1 wt.-%, based on the total weight of composition (A). In one embodiment, composition (A) comprises, preferably consists of 10 to 90 wt.-%, based on the total weight of composition (A), of styrene dimers, 10 to 90 wt.-%, based on the total weight of composition (A), of styrene trimers, 0 to 70 wt.-%, based on the total weight of composition (A), of other styrene oligomers, 0 to 70 wt.-%, based on the total weight of composition (A), of styrene monomers, 0 to 20 wt.-%, based on the total weight of composition (A), of monomers other than styrene, oligomers of such monomers and/or co-oligomers of such monomers, preferably with styrene, and 0 to 10 wt.-%, based on the total weight of composition (A), of auxiliaries, additives and/or impurities.

In another embodiment, composition (A) comprises, preferably consists of 20 to 85 wt.-%, based on the total weight of composition (A), of styrene dimers, 15 to 80 wt.-%, based on the total weight of composition (A), of styrene trimers, 0 to 40 wt.-%, based on the total weight of composition (A), of other styrene oligomers, 0 to 50 wt.-%, based on the total weight of composition (A), of styrene monomers, 0 to 15 wt.-%, based on the total weight of composition (A), of monomers other than styrene, oligomers of such monomers and/or co-oligomers of such monomers, preferably with styrene, and 0 to 5 wt.-%, based on the total weight of composition (A), of auxiliaries, additives and/or impurities.

In another embodiment, composition (A) comprises, preferably consists of 30 to 80 wt.-%, based on the total weight of composition (A), of styrene dimers, 20 to 70 wt.-%, based on the total weight of composition (A), of styrene trimers, 0 to 20 wt.-%, based on the total weight of composition (A), of other styrene oligomers, 0 to 30 wt.-%, based on the total weight of composition (A), of styrene monomers, 0 to 10 wt.-%, based on the total weight of composition (A), of monomers other than styrene, oligomers of such monomers and/or co-oligomers of such monomers, preferably with styrene, and 0 to 2 wt.-%, based on the total weight of composition (A), of auxiliaries, additives and/or impurities.

In another embodiment, composition (A) comprises, preferably consists of 35 to 75 wt.-%, based on the total weight of composition (A), of styrene dimers, 25 to 65 wt.-%, based on the total weight of composition (A), of styrene trimers, 0 to 20 wt.-%, based on the total weight of composition (A), of other styrene oligomers, 0 to 25 wt.-%, based on the total weight of composition (A), of styrene monomers, 0 to 5 wt.-%, based on the total weight of composition (A), of monomers other than styrene, oligomers of such monomers and/or co-oligomers of such monomers, preferably with styrene, and 0 to 1 wt.-%, based on the total weight of composition (A), of auxiliaries, additives and/or impurities.

Preferably, the composition (A) is obtained as a by-product of a process for producing styrene monomers from at least one type of styrene polymer or styrene co-polymer (P).

Such processes often lead to incomplete depolymerization of the at least one type of styrene polymer or styrene co-polymer, thus that styrene oligomers and/or styrene cooligomers are found alongside the desired styrene monomers in the mixture obtained from the depolymerization reactor. These styrene oligomers and/or styrene co-oligomers are then often separated from the styrene monomers, e.g. by distillation, resulting in a fraction comprising the oligomers and/or co-oligomers, which can then be used as composition (A) directly or following additional purifying steps.

Step b)

In step b), a depolymerization reactor (R) with a reaction zone (Z) is provided. The depolymerization reactor (R) is not particularly limited and may be any depolymerization reactor that has a reaction zone (Z) and can be set to a defined high temperature (T) inside the reaction zone (Z) and an average residence time (tA) of composition (A) in the reaction zone (Z). The temperature (T) inside the reaction zone (Z) of the depolymerization reactor (R) is set to a temperature of above 500° C. to below 800° C., preferably from 550° C. to 750° C., more preferably from 570° C. to 720° C., more preferably from 580° C. to 670° C., more preferably from 590° C. to 620° C., more preferably 595° C. to 605° C.

The average residence time (tA) of composition (A) in the reaction zone (Z) is set to a value greater than 0.01 seconds, preferably greater than 0.05 s, more preferably greater than 0.1 s but less than 60 s, preferably less than 30 s, more preferably less than 10 s. For example, the average residence time (tA) can be set to a value of from 0.2 s to 5 s or from 0.3 to 4 s. In a preferred embodiment, the average residence time (tA) is set to a value of from 1 s to 4 s.

It is advantageous if the average residence time (tA) of composition (A) in the reaction zone (Z) of the depolymerization reactor (R) is controlled by a stream of an inert gas or of a mixture of inert gases that do not directly react with the styrene oligomers or monomers in composition (A) under the conditions of the process. For example, the residence time (tA) can be controlled by a stream of steam, $CO_2$, aliphatic hydrocarbons, helium, argon or nitrogen. Preferably, the residence time (tA) is controlled by a stream of nitrogen. This control of the average residence time (tA) is particularly beneficial in processes wherein the composition (A) is fed to the reactor continuously, and preferably wherein composition (B) is removed from the reactor continuously, since the rate at which the feeding or removal takes place can be controlled by regulating the flow rate of the inert gas stream.

The temperature (T) inside the reaction zone (Z) of the depolymerization reactor (R) can be set by any known means. For example, the temperature (T) can be set by using microwave radiation, resistive heating wires (resistance heating), which may be in contact with the walls of the reaction zone (Z), or by introducing heated or superheated inert gas, preferably nitrogen, into the reactor. Preferably, the temperature inside the reaction zone (Z) is set by means of resistance heating.

Examples of suitable depolymerization reactors (R) are extruders, batch reactors, rotary kilns, stirred vessels, Microwave reactors, tube reactors, tube bundle reactors, vortex reactors and fluidized bed reactors. Preferably, the depolymerization reactor (R) is a fluidized bed reactor or a tube reactor. More preferably, the depolymerization reactor is a tube reactor. In case the reactor (R) is a fluidized bed reactor, it is advantageous if the fluidized bed reactor contains a fixed bed of solid material, such as silicon dioxide ($SiO_2$) or silicon carbide (SiC), preferably SiC, as it has a particularly good chemical and mechanical stability, heat conductive properties and heat capacity. This combination of properties of SiC is beneficial for endothermic processes such as depolymerization of styrene oligomers. Preferred SiC materials have a (weight average) particle size of from to 1000 μm, preferably of from 40 to 500 μm.

Step c)

In step c), the composition (A) is fed into the reaction zone (Z) of the depolymerization reactor (R). This can be carried out in a single batch, portion-wise or continuously. Preferably, the feeding is carried out continuously.

Furthermore, it may be favorable to feed the composition (A) into the reaction zone (Z) of the reactor (R) in the absence of polymers or co-polymers, such as styrene polymers or co-polymers. This is often the case when the polymers or co-polymers are mixed with substances that would unnecessarily contaminate the styrene monomers obtained by the process of the invention. This may also be the case, when the polymers or co-polymers are typically depolymerized at different reaction conditions than the oligomers in composition (A).

Alternatively, it may be favorable to feed the composition (A) into the reaction zone (Z) of the reactor (R) together with at least one styrene polymer or styrene co-polymer, which is preferably not densified. This is often the case when the styrene polymer or styrene co-polymer is typically depolymerized under similar conditions as the oligomers in composition (A). This may also be the case when both styrene polymers or styrene co-polymers and the composition (A) need to be depolymerized into styrene monomers, but only a single depolymerization reactor (R) is available.

If the composition (A) is obtained as a by-product of a process for producing styrene monomers from at least one type of styrene polymer or styrene co-polymer (P), it may be advantageous if the depolymerization reactor in which the process for producing styrene monomers from at least one type of styrene polymer or styrene co-polymer (P) is carried out, is the same depolymerization reactor in which the process of the invention is carried out, and the conditions of both processes are the same.

Thus, it may be advantageous, if the process for producing styrene monomers from composition (A) comprising at least one type of styrene oligomer, takes place in the reaction zone (Z) of the depolymerization reactor (R) at the temperature (T) and an average residence time (tP) of the styrene polymer or styrene co-polymer (P) in the reaction zone (Z) set to a value greater than 0.01 s but less than 60 s, and the composition (A) is refed into the reaction zone (Z) alongside the at least one type of styrene polymer or styrene co-polymer (P), which is preferably not densified. In this case, the styrene oligomers in composition (A) are depolymerized together with the at least one styrene polymer or styrene co-polymer (P), thus that there is no need to install a second reactor to depolymerize the styrene oligomers separately.

Step d)

In step d), at least a portion of the at least one type of styrene oligomer from composition (A) is depolymerized inside the reaction zone (Z) of the depolymerization reactor (R).

The depolymerization is typically carried out under an atmosphere of an inert gas or of a mixture of inert gases that does not directly react with the styrene oligomers or monomers in composition (A) under the conditions of the process. For example, the depolymerization can take place under an atmosphere of steam, $CO_2$, aliphatic hydrocarbons, helium, argon or nitrogen. Preferably, the depolymerization, more preferably the entire process of the invention, takes place under an atmosphere of nitrogen. The term "atmosphere" in the present context is not to be understood as a unit of pressure (1 atm=1.013 bar), but is to be understood as the main, preferably the only constituent of the gaseous phase in the reactor that does not originate from the reactants fed to the reaction or the products obtained therefrom.

During the depolymerization step d), at least a portion of the styrene oligomers, preferably all styrene oligomers from composition (A), is decomposed (depolymerized) into styrene monomers and sometimes oligomers having a smaller number of repeating units than those present in composition (A). In addition, the other components of composition (A), if present, are decomposed into their corresponding decomposition products, which may also include styrene if co-oligomers of styrene with other monomers are present in composition (A).

Together, the products formed in the depolymerization step d) form composition (B) comprising styrene monomers. This composition (B) typically comprises more than 25 wt. %, preferably more than 30 wt.-%, more preferably more than 40 wt.-%, even more preferably more than 60 wt.-%, even more preferably at least 80 wt.-% based on the total weight of composition (B), of styrene monomers.

Preferably, the amount of acrylonitrile in the composition (B) is less than 5% by weight, more preferably less than 3% by weight, even more preferably less than 1% by weight, based on the total weight of composition (B).

Step e)

In step e), composition (B) is removed from the reaction zone (Z). The removal method is not particularly limited and can be done by any known means. For example, removal of composition (B) can be continuous or discontinuous. Preferably the removal is continuous. More preferably, composition (B) is removed from the reaction zone (Z) of the depolymerization reactor (R) as a gas. In this case, removal can be achieved, e.g. by applying reduced pressure, or it can take place automatically due to the increased pressure inside the reaction zone (Z). Furthermore, removal can be achieved by applying a stream of inert gas, preferably nitrogen, which at the same time is used for controlling the residence time (tA) of composition (A) inside the reaction zone (Z) of the depolymerization reactor (R).

During or after removal of composition (B) from the reaction zone (Z) of the depolymerization reactor (R), it may be advantageous to rapidly stop the reaction, e.g. by means of a quencher, wherein the composition (B) is cooled to a temperature below 250° C. Preferably, the composition (B) is cooled in the quencher within less than 10 seconds, more preferably within less than 5 seconds, even more preferably within less than 1 second, to a temperature below 250° C. This step serves the purpose of stabilizing the depolymerization products in composition (B) and reducing the risk of re-polymerization of the styrene monomers. Exemplary quenchers are described in EP-B 1966291 (2009).

Step f)

In step f), at least a portion, preferably all of the styrene monomers are isolated from the composition (B). It can be advantageous if composition (B) is condensed to a liquid by cooling composition (B) to a temperature below the condensation point of styrene monomers. Preferably, composition (B) is cooled to a temperature below 70° C., more preferably below 50° C., even more preferably below 40° C. For example, composition (B) can be cooled to a temperature of from −200° C. to 70° C., preferably from −50° C. to 40° C., more preferably from −5 to 30° C.

Cooling of composition (B) can be achieved by any known method. For example, it may be achieved by contacting composition (B) with a solid surface that is cooled with water or air. Alternatively, it may be achieved by means of atomized water or mist that is brought into direct contact with composition (B).

During cooling, volatile substances that have a lower condensation point than styrene monomers can be separated from composition (B). In case of cooling by means of atomized water or mist, the condensed portion of composition (B) comprising styrene monomers is collected as an organic phase together with an aqueous phase originating from the atomized water or mist. After separation of the two phases, the aqueous phase may be re-used to form atomized water or mist for cooling composition (B) removed from the reaction zone (Z) of the depolymerization reactor (R).

The condensed composition (B) may then be subjected to separation techniques in order to isolate styrene monomers from the other components. Separation techniques include, liquid-solid-separation techniques, e.g. sedimentation, centrifugation, filtration, distillation, sublimation and/or decanting. Separation techniques also include other separation techniques, e.g. distillation, such as fractionated distillation, chromatography, such as column chromatography, HPLC or flash chromatography, and crystallisation, such as fractionated crystallisation. Preferably, the separation techniques in step f) include at least one distillation step, more preferably a fractionated distillation step. This allows particularly effective isolation of styrene monomers from the condensed composition (B). Fractions of condensed composition (B) containing styrene oligomers and/or styrene cooligomers, preferably styrene dimers and/or styrene trimers, can be re-fed to the reaction zone (Z) of the depolymerization reactor (R), to further increase the yield of styrene monomers. The styrene monomer product isolated in step f) typically contains less than 10 wt.-%, preferably less than 1 wt.-%, more preferably less than 0.1 wt.-%, even more preferably less than 0.01 wt.-% of styrene dimers and/or trimers.

The invention is further illustrated by the following examples, Figures and claims.

EXAMPLES

The process was carried out in a reactor setup comprising a tube reactor equipped with a resistance heater, a nozzle for feeding the oligomer samples into the reactor, a dosing automation for continuously feeding the oligomer samples through the nozzle into the reactor, an $N_2$ inlet for controlling the residence time of the samples in the tube reactor, a quenching apparatus for condensing the products obtained from the reactor, and a sampling vessel for collecting the condensed products.

Figure 1:
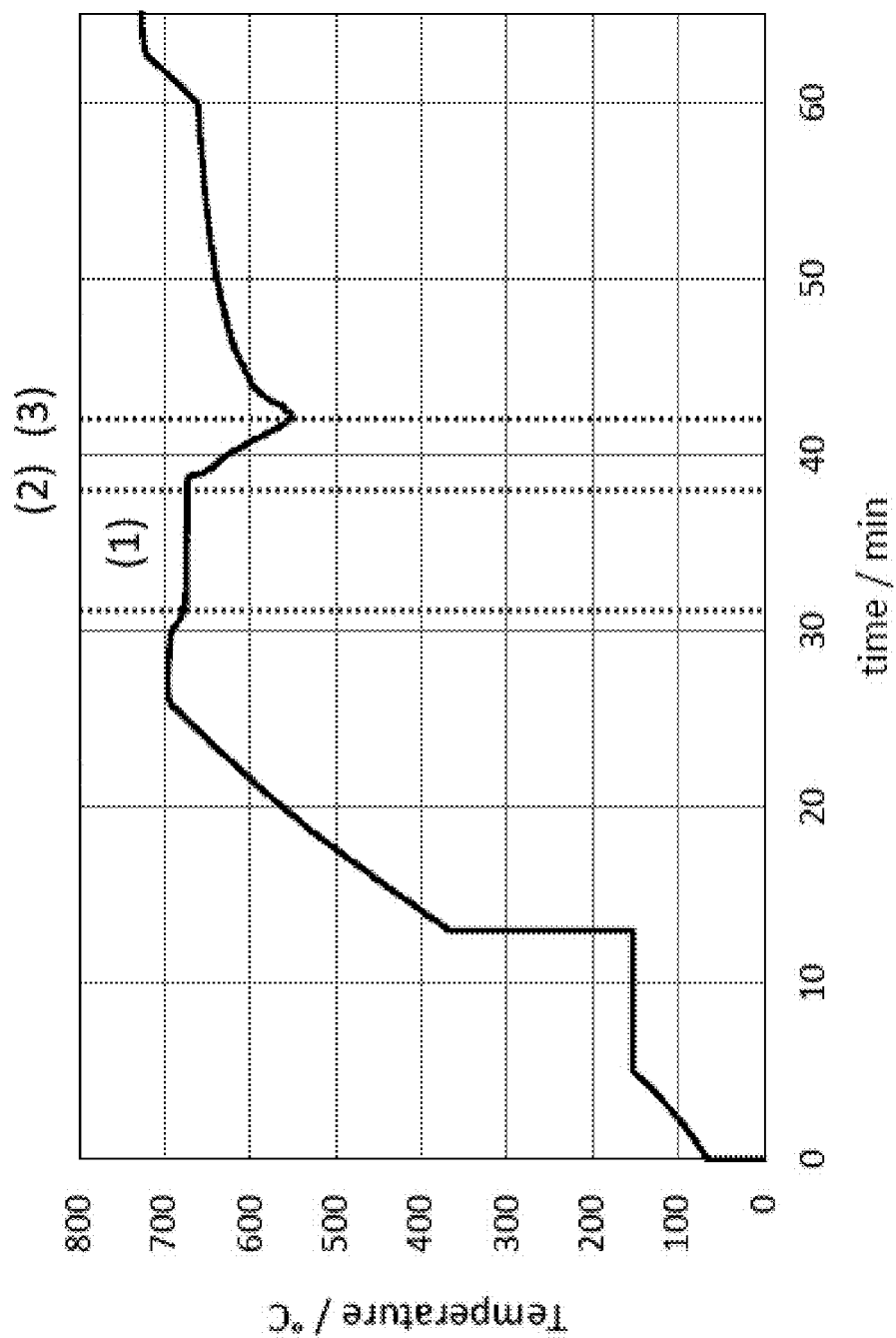
FIG. 1 shows the temperature program (temperature over time) used for the depolymerization reactions.
Figure 2:
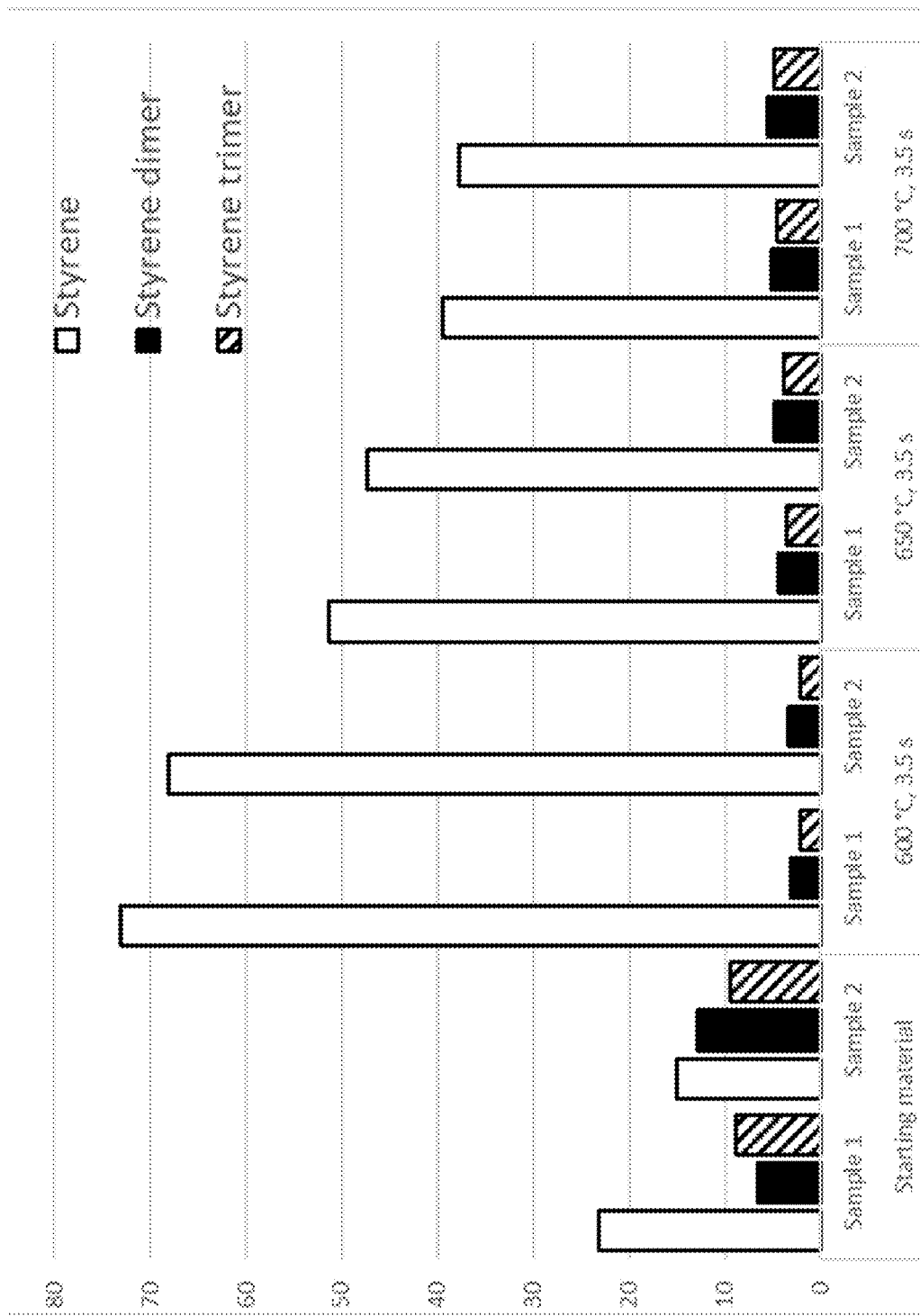
FIG. 2 shows the distribution of styrene monomers, dimer and trimers in the respective products obtained.

An exemplary temperature program (temperature over time) used for the depolymerization reactions is displayed in FIG. 1, wherein (1) indicates an interval of at least 5 min, wherein the temperature was kept stable before the feeding of the oligomer mixture was initiated, (2) indicates the start of the reaction and (3) indicates the end of the reaction. The residence times of the oligomers inside the reaction zone of the reactor were controlled by means of a nitrogen stream. The temperature inside the reactor was controlled by means of the resistance heater. The supply of styrene oligomers was 2 g/min and was controlled by means of the dosing automation. The reactions were carried out under $N_2$ atmosphere. Two different styrene oligomer samples were used as examples for various depolymerization testings, as shown in FIG. 2.

The compositions (wt.-%) of Samples 1 and 2 are shown in Table 1.

TABLE 1

|  | Sample 1 (Ex. 1) | Sample 2 (Ex. 2) |
|---|---|---|
| Styrene | 23 | 15 |
| Styrene dimer | 7 | 14 |
| Styrene trimer | 9 | 9.5 |
| Others (e.g. higher Oligomers) | 61 | 61.5 |

The compositions of the product mixtures (wt. %) obtained from depolymerization reactions at different conditions (varying temperature/residence time) are shown in Table 2.

TABLE 2

|  | 600° C., 3.5 s | | 650° C., 3.5 s | | 700° C., 3.5 s | |
|---|---|---|---|---|---|---|
|  | Ex. 1 | Ex. 2 | Ex. 1 | Ex. 2 | Ex. 1 | Ex. 2 |
| Styrene | 73 | 68 | 51.5 | 47.5 | 39.5 | 38 |
| Styrene dimer | 3 | 3.5 | 4.5 | 5 | 5 | 5.5 |
| Styrene trimer | 2 | 2 | 3.5 | 4 | 4.5 | 5 |
| Others | 22 | 26.5 | 40.5 | 43.5 | 51 | 51.5 |

From the results shown it can be seen that a very good yield of styrene monomers is obtained at 600° C. and a residence time of 3.5 seconds. FIG. 2 shows the distribution of styrene monomers, dimers and trimers in the respective products obtained.

Similar experiments can be repeated e.g. at 750° C. and different residence times, e.g. from 0.05 to 10 seconds or at 550° C. and residence times from of 0.1 to 20 seconds.

The invention claimed is:

1. A process for producing styrene monomers from styrene oligomers comprising the following steps:
    a) providing a composition (A) comprising at least one type of styrene oligomer, wherein the composition (A) comprises at least 15 wt.-%, based on the total weight of composition (A), of styrene dimers and/or styrene trimers;
    b) providing a depolymerization reactor (R) with a reaction zone (Z);
    c) feeding the composition (A) into the reaction zone (Z) of the reactor (R);
    d) depolymerizing at least a portion of the at least one type of styrene oligomer in the reaction zone (Z) to obtain a composition (B), comprising styrene monomers;
    e) removing the composition (B) from the reaction zone (Z); and
    f) isolating at least a portion of the styrene monomers from the composition (B);
    wherein the temperature (T) inside the reaction zone (Z) of the reactor is set to a value of greater than 500° C. to a value of less than or equal to 670° C.; and
    wherein the average residence time (tA) of the composition (A) in the reaction zone (Z) of the reactor is set to a value greater than 0.01 s but less than 60 s.

2. The process of claim 1, wherein the average residence time (tA) of the composition (A) in the reaction zone (Z) is set to a value of less than 30 s.

3. The process of claim 1, wherein the composition (A) comprises at least 10 wt.-%, based on the total weight of composition (A), of styrene dimers, and at least 5 wt.-%, based on the total weight of composition (A), of styrene trimers.

4. The process of claim 1, wherein the composition (A) is obtained as a byproduct of a process for producing styrene monomers from at least one type of styrene polymer or co-polymer (P).

5. The process of claim 1, wherein the composition (A) is fed into the reaction zone (Z) of the reactor (R) in the absence of polymers or co-polymers.

6. The process of claim 1, wherein the composition (A) is fed into the reaction zone (Z) of the reactor (R) together with at least one styrene polymer or styrene co-polymer.

7. The process of claim 6, wherein the at least one type of styrene polymer or styrene co-polymer (P) is not densified.

8. The process of claim 4, wherein the process for producing styrene monomers from at least one type of styrene polymer or styrene co-polymer (P) takes place in the reaction zone (Z) of the depolymerization reactor (R) at the temperature (T) and an average residence time (tP) of the styrene polymer or styrene co-polymer (P) in the reaction zone (Z) set to a value greater than 0.01 s but less than 60 s, and the composition (A) is re-fed into the reaction zone (Z) alongside the at least one type of styrene polymer or styrene co-polymer (P).

9. The process of claim 8, wherein the styrene polymer or styrene copolymer is not densified.

10. The process of claim 1, wherein the temperature (T) is set to a value of 550° C. to 670° C.

11. The process of claim 1, wherein the temperature (T) is set to a value of 595° C. to 605° C.

12. The process of claim 1, wherein the process takes place under a nitrogen atmosphere.

13. The process of claim 1, wherein the average residence time (tA) is controlled by a stream of nitrogen.

14. The process of claim 1, wherein the depolymerization reactor (R) is a fluidized bed reactor.

15. The process of claim 14, wherein the fluidized bed reactor contains silicon carbide (SiC) particles.

16. The process of claim 1, wherein step f) comprises condensation and/or distillation of at least a portion of composition (B).

17. The process of claim 1, wherein the composition (A) comprises at least 40 wt.-%, based on the total weight of composition (A), of styrene dimers and styrene trimers.

18. The process of claim 1, wherein the maximum degree of polymerization of any of the styrene oligomers in composition (A) does not exceed 20 styrene repeating units.

19. The process of claim 1, wherein the maximum degree of polymerization of any of the styrene oligomers in composition (A) does not exceed 5 styrene repeating units.

20. The process of claim 1, wherein the styrene monomers comprise less than 0.01 wt.-% of styrene dimers and/or styrene trimers.

* * * * *